Figure 1:
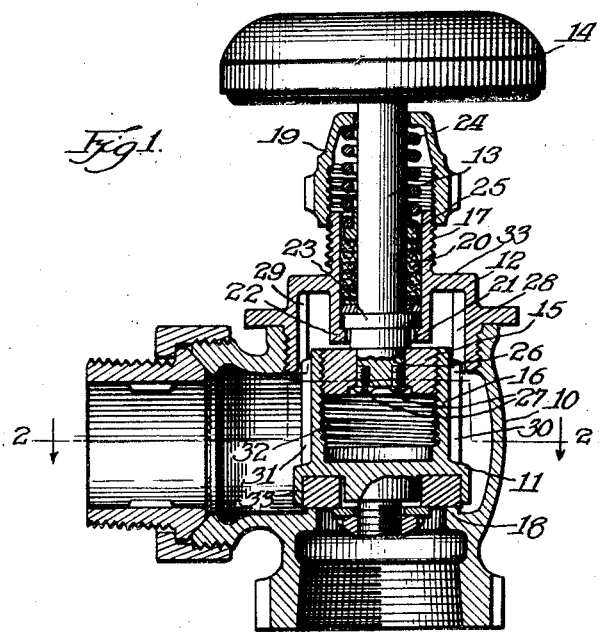

Sept. 8, 1931.  C. A. OLSON  1,822,666
SELF PACKING VALVE
Filed May 25, 1929

Witness
R.B.Davison

Inventor:
Charles A Olson
By Ira J Wilson
Atty

Patented Sept. 8, 1931

1,822,666

UNITED STATES PATENT OFFICE

CHARLES A. OLSON, OF GENEVA, ILLINOIS, ASSIGNOR TO CRANE CO., OF CHICAGO, ILLINOIS, A CORPORATION OF ILLINOIS

SELF-PACKING VALVE

Application filed May 25, 1929. Serial No. 365,801.

This invention relates to improvements in valves and particularly to valves of the self-packing non-rising stem type.

One of the objections heretofore encountered in the use of valves of this type is that they are prone to leak when used in steam lines or in other places where high temperatures are encountered. These high temperatures, when the valves were open, caused the stem and connected parts to expand. When the valves were then closed, cutting off the high temperature fluid, the stems and other parts would cool down and consequently contract with the result that the valve discs would crack away from their seats resulting in leakage.

An object of the present invention is to provide a valve which will at all times when closed be held snugly against its seat so as to obviate leakage.

Another object is to accomplish this result by utilizing the packing spring for that purpose, thus eliminating additional springs and other complications which have heretofore been resorted to in an effort to overcome the leakage tendency.

Another object is to maintain the valve packing under the requisite compression at all times and to automatically increase the packing pressure by the act of forcing the valve disc against its seat.

A further object of the invention is to accomplish the application of the additional pressure on the packing through the agency of the valve stem which acts to transmit the pressure to the packing when the valve is closed or seated.

The invention has these and other objects, all of which will be explained in detail and more readily understood when read in conjunction with the accompanying drawings which illustrate one embodiment of which the invention is susceptible, it being obvious that changes and modifications may be resorted to without departing from the spirit of the appended claim forming a part hereof.

Figure 2:
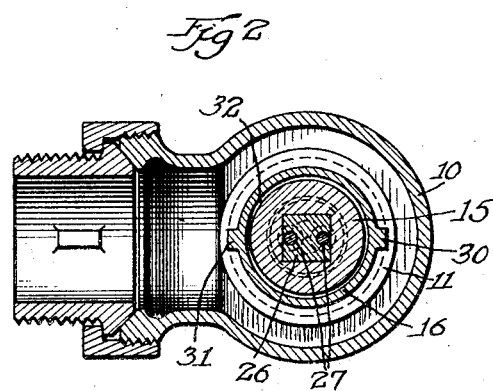

In the drawings:

Fig. 1 is a central section of a valve of the non-raising stem type having the invention applied thereto, and Fig. 2 is a section taken on line 2—2 of Fig. 1.

The valve structure illustrated in the drawings contemplates the use of a valve casing 10 having the usual inlet and outlet controlled by the valve 11. The valve casing structure also includes the bonnet 12 in which a non-rising valve stem 13 is rotatably mounted. This valve stem 13 has one end provided with the usual hand wheel 14 and has the opposite end thereof provided with the threaded head or element 15 which cooperates with the internally threaded non-rotatable tubular portion 16 which is part of the valve generally designated 11. This construction serves for moving the valve 11 relatively to the seat 18 to open and close the valve.

The bonnet 12 is provided with a neck 17 which is threaded as shown at 18 to receive the cap 19. The bore of this neck provides a housing for the packing material 20 and the lower end of said neck is provided with an opening 21 through which the lower end of the stem projects. This end of the neck is also provided with an inwardly projecting annular flange 22 upon which the annular collar 23 formed on the stem 13 is adapted to rest.

A coil spring 24 surrounding the stem 13 of the valve is compressed between the cap 19 and a loose collar 25 resting upon the packing 20. It will be manifest that the spring 24 will exert a pressure determined by the adjustment of the cap upon the packing 20 and force said packing against the collar 23 of the stem 13, thereby urging the collar 23 against the seat formed by the inwardly projecting flange 21. A metallic anti-friction washer 33 is preferably interposed between the upper face of collar 23 and the bottom of the packing 20.

The end 26 of the valve stem may be square or may be splined to the head 15 to hold the stem and threaded head 15 against relative rotation. In the present showing these parts are held in associated relation by means of screws such as 27. The bonnet 12 is provided with the ribs 28 and 29 which are designed to engage in longitudinal guide grooves 30 and 31 formed in the tubular portion 16 of the valve 11. The interengaging ribs and grooves hold the valve against rotation and guide its movements toward and away from the seat 18.

From the foregoing description of the structure it will be evident that the spring 24 serves to compress the packing 20 against the collar 23, and also to urge the stem downwardly so that its collar 23 normally seats upon the flange 21. The valve may be closed by rotation of the hand wheel in the usual manner but after the disc has been closed against its seat, further rotative movement of the stem will cause the stem to rise against the force of spring 24, thereby lifting the collar 23 away from its supporting flange 21. The upward thrust of collar 23 increases the compression of the packing and insures against leakage. The clearance thus obtained between flanges 21 and collar 23 by forcing the disc against its seat enables considerable contraction of the stem and associated parts upon cooling without relieving the valve disc of the pressure of spring 24. The disc is accordingly held snugly against its seat even when the valve has cooled down and any danger of leakage as the result of the cooling is entirely obviated.

Having thus described the invention, what I claim and desire to cover by Letters Patent is:

In a valve of the non-rising stem type, the combination of a valve body provided with a stuffing box, a valve stem extending through said box and provided with a collar disposed within said stuffing box, a valve connected with the lower end of said stem, an adjustable stuffing box cap, and a spring interposed between said cap and the packing adapted to compress the packing and to exert a downward thrust upon the valve stem through said collar for holding said valve against its seat.

In witness of the foregoing I affix my signature.

CHARLES A. OLSON.